Oct. 9, 1928.

R. V. LIPE

VEHICLE BRAKE

Filed March 5, 1926

INVENTOR

Raleigh V. Lipe.

Patented Oct. 9, 1928.

1,686,870

UNITED STATES PATENT OFFICE.

RALEIGH V. LIPE, OF CINCINNATI, OHIO.

VEHICLE BRAKE.

Application filed March 5, 1926. Serial No. 92,568.

This invention relates to and has for an object to produce a vehicle brake construction adapted for attachment to the front or steering wheels of motor vehicles so that vehicles of the usual rear or two wheel brake type may be quickly and satisfactorily converted into one having complete four wheel braking equipment without substitution of existing parts of the vehicle or alterations being made therein.

A further object is to produce a front wheel brake attachment which, in its construction, attachment and operation will place all operating parts thereof away from the road surface or danger of damage through flying rocks or other obstructions, and of liability to damage through minor collisions.

These and other objects are attained in the construction described in the following specification and illustrated in the accompanying drawing, in which.

Figure 1:
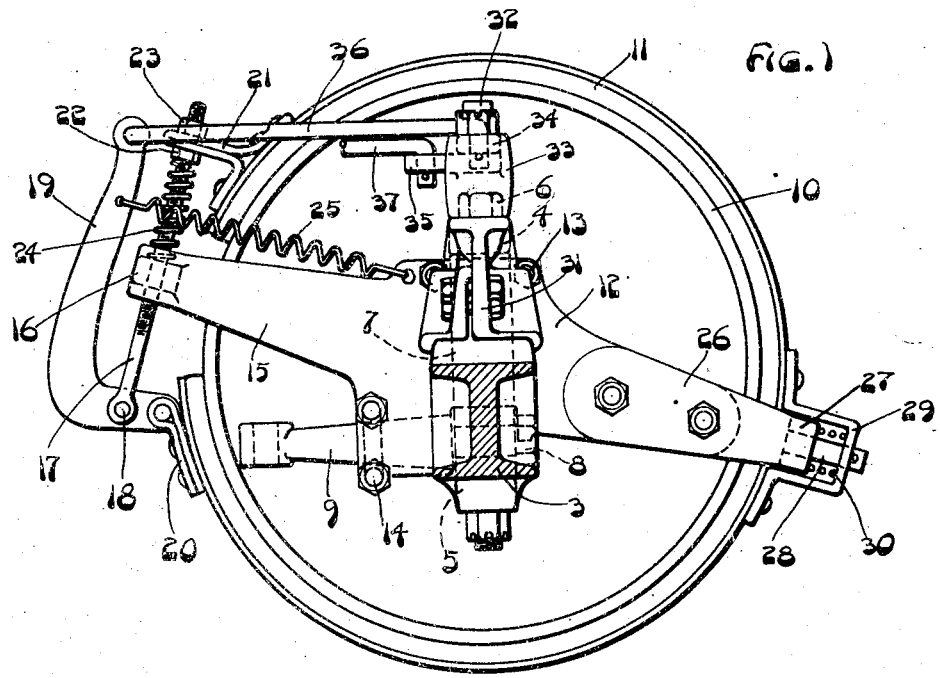
Fig. 1, is an elevational view of a mechanism embodying my invention, looking at it from the inside face of the brake drum, the axle being shown in transverse cross section and the wheel having been eliminated for clearness of illustration.
Figure 2:
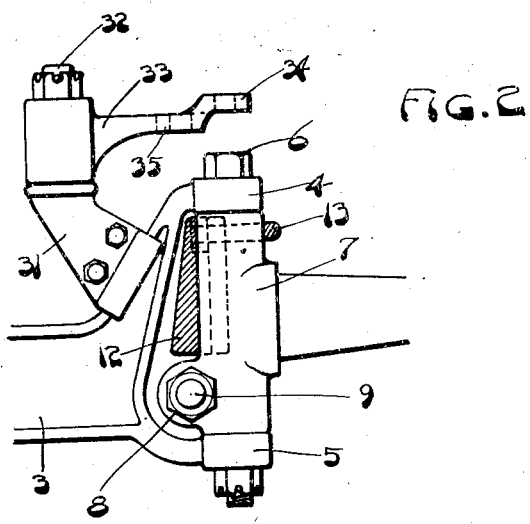
Fig. 2 is a fragmental side elevation disclosing parts of the construction shown in Fig. 1, for the purpose of showing the manner of mounting such parts.

In the view Fig. 1, the axle 3 is shown in transverse section and its bearings 4 and 5, which are better shown in Fig. 2, carries king bolt 6 which pivots steering knuckle 7 upon which the road wheel is mounted. A lug 8 on the steering knuckle carries the arm 9 to which the reach rod is attached. Thus far the construction is but of the usual type of vehicle steering wheel mounting and control, but by means of the attachments I will now describe, a brake may be attached to the front wheel and made to operate simultaneously with those of the rear wheels.

The wheel, which is not shown, has attached to it in any suitable manner known in the art, a drum 10 upon which a brake band 11 is mounted. In order that this band may be held against displacement I have provided a frame 12 which is clamped to the steering knuckle 7 and arm 9 by U-bolts 13 and 14. This causes the frame to move as a unit with the steering knuckle and wheel carrying the drum 10. A rearwardly extending arm 15 is provided with a lug 16 through which a bolt 17 passes for free movement therethrough. One end of this bolt is pivoted at a point 18 on a lever 19 which is pivotally attached at its lower end to the end of the lower half of the brake band by means of a bracket 20 on the brake band. The upper end of the lever is left for attachment to operating links as will be described. Bolt 17 passes through a bracket 21 at the end of the upper half of the brake band, with nuts 22 and 23 located on each side of the bracket so that band adjustment may be obtained. A spring 24 on the bolt operates to release the band, as is usual. An additional spring 25 attached to lever 19 and frame 15 may be provided if desired. At the front of the frame 12 an arm 26 carries a lug 27 from which a pin 28 extends. A bracket 29 on the middle of the brake band passes the pin and is guided thereby as well as by the lug 27, with a spring 30 between the lug and bracket to hold the band normally away from the drum until the band is tightened thereon. Thus through springs 24 and 30 the band is held normally free of the drum, as is usual.

And now, to the upwardly extending portion of the axle which carries bearing 4, I clamp a bracket 31. This bracket carries a bearing pin 32 upon which an arm 33 is pivotally mounted. This arm has two lugs 34 and 35 for the attachment of brake operating elements. Lug 34 is axially aligned with the king bolt 6 while lug 35 is slightly away from lug 34. In lug 34 a short link 36 is mounted and attached to the upper end of lever 19. To lug 35 the brake rod 37 is attached, which extends to the existing brake mechanism of the vehicle, to which it is suitably attached.

Thus, in the operation of my improved construction there is no position of the steering wheel wherein the operation of its brake is affected, because lug 34 is axially aligned with king bolts 6, thus allowing link 36 to function regardless of the positions of the wheel and attached brake mechanism. In addition to this the elements of the mechanism occupy an elevated position, with the vital portions thereof lying in the rear of the wheel and its brake drum, thus avoiding possible damage to the brake through impact and collision with minor obstructions.

Having thus described my invention what I claim is:

A front wheel brake attachment for motor vehicles, comprising a brake drum attached to the wheel, a frame attached to the wheel steering knuckle, integral with said frame a rearwardly extending arm with a bolt receiving lug at its upper end and a forwardly extending arm with a lug and a pin therein at its lower end, a brake band mounted in drum encircling position and a bracket attached to the middle of the brake band, an aperture in the bracket's top to take on and through itself the aforesaid pin, a lever hingedly mounted to one free end of the brake band and an upwardly extending bolt pivoted to the lever adjacent its hinge, a bolt receiving bracket mounted on the remaining free end of the brake band and the bolt end attached thereto, an expansion spring encircling the bolt between the bracket and first mentioned extended arm for brake band easing off the drum, a pin bearing bracket attached to the axle portion of the motor vehicle and an arm with lugs mounting the pin, the outer of said lugs being linked to the lever and axially aligned with the king bolt of the steering knuckle, operable means for controlling the brake being attached to the inner of said lugs.

In witness whereof, I affix my signature.

RALEIGH V. LIPE.